Aug. 30, 1938.  A. H. JUNG  2,128,826
COOLED BEARING
Filed July 1, 1937  2 Sheets-Sheet 2
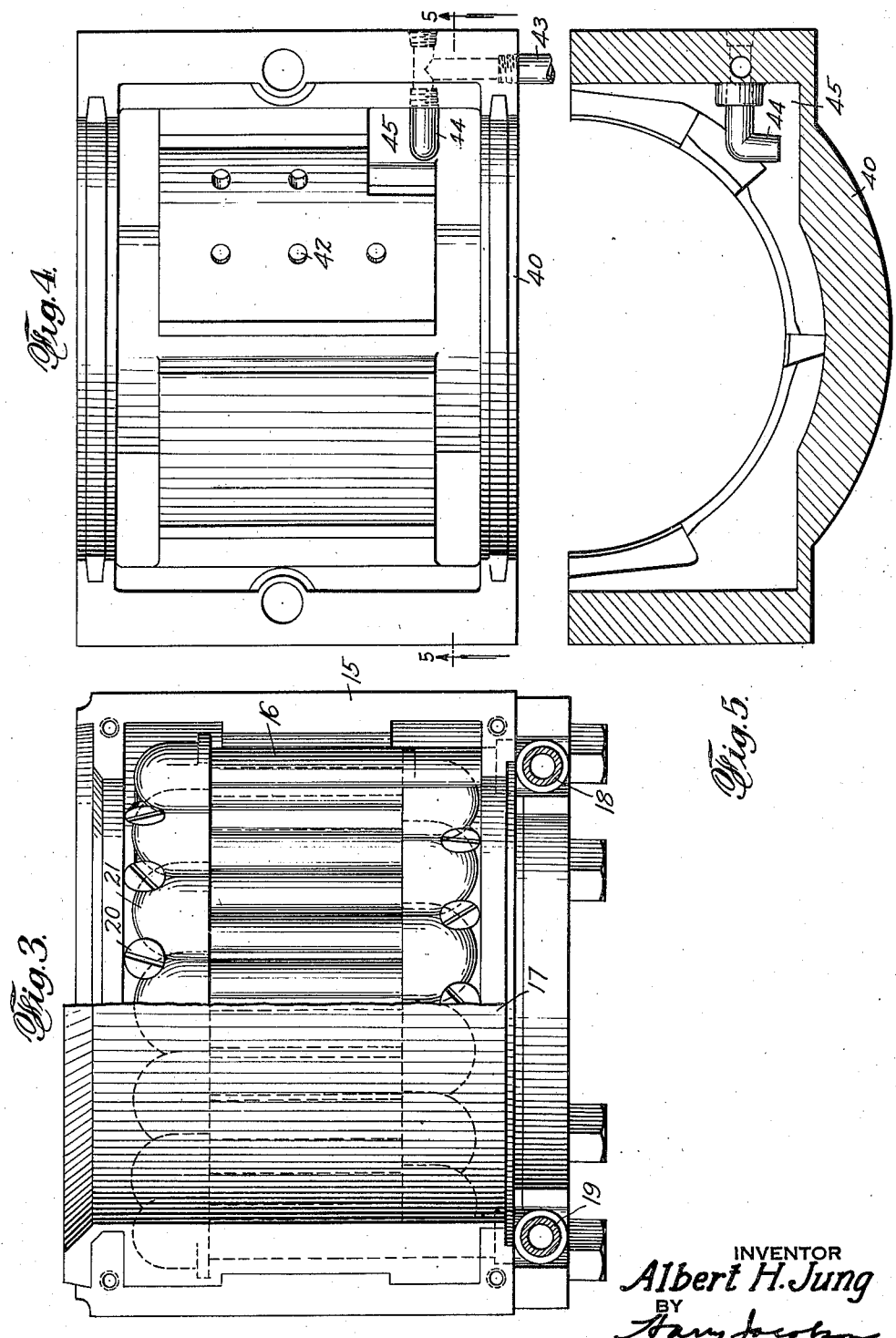
INVENTOR
Albert H. Jung
BY
ATTORNEY Patented Aug. 30, 1938

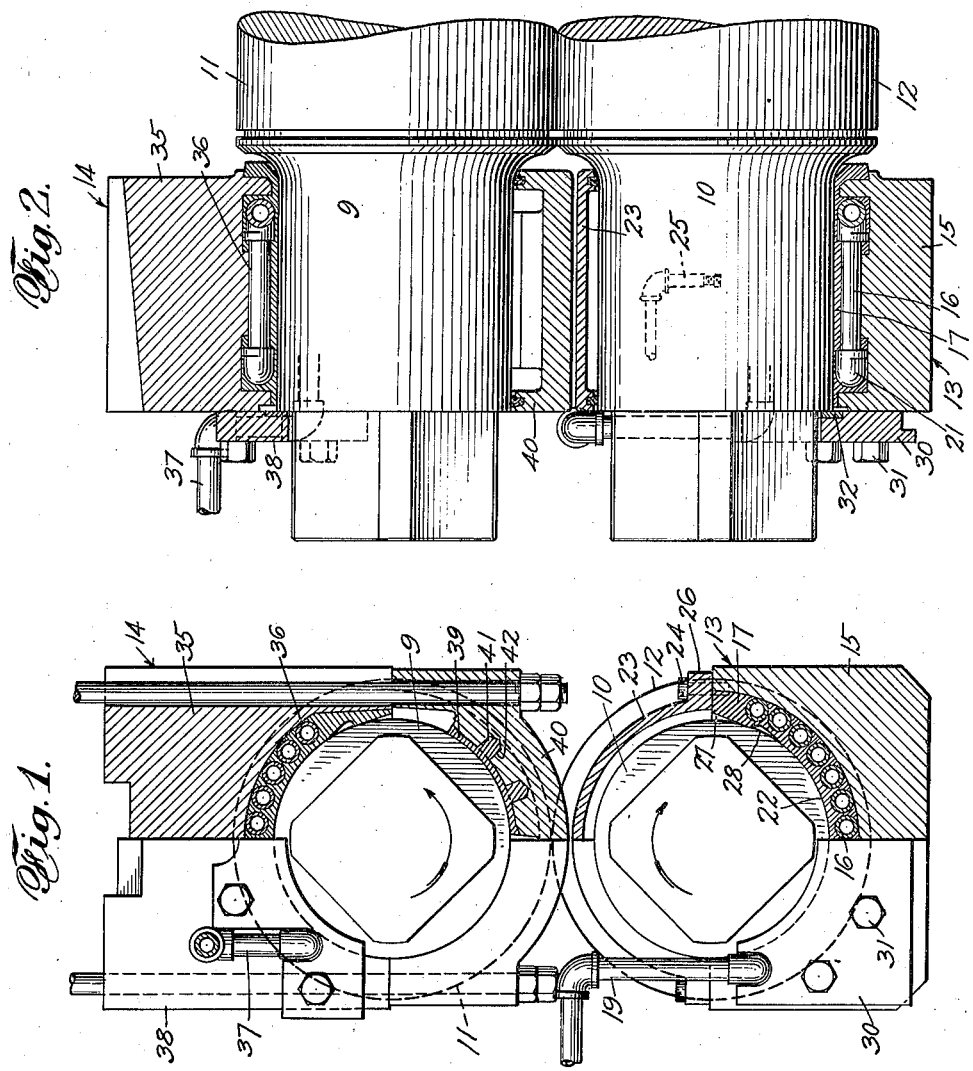

2,128,826

UNITED STATES PATENT OFFICE 2,128,826

COOLED BEARING

Albert H. Jung, Flushing, N. Y.

Application July 1, 1937, Serial No. 151,327

10 Claims. (Cl. 308—77)

This invention relates to bearings and particularly to that type employing a cast or otherwise formed metal liner of babbitt or the like bearing metal.

My invention is particularly adapted for use in connection with shafts subjected to comparatively heavy pressure or run at comparatively high speeds or both, or in which considerable heat is developed for the above or other reasons.

My invention contemplates the provision of a bearing cooled by running liquid brought so close to the innermost bearing surface, that the heat generated by operation of the bearing is conducted away from the bearing surface faster than the heat can be generated.

My invention further contemplates the provision of a bearing in which a minimum amount of bearing metal is provided between the rotating parts and the cooling medium.

My invention further contemplates the provision of a simple and efficient bearing wherein the bearing metal serves the double function of holding the cooling coil in position and acting as a proper bearing surface.

The various objects of the invention will be clear from the description which follows and from the drawings, in which, Fig. 1 is a partial end elevation and partial vertical section of a pair of rolling mill shafts to which my invention has been applied.

Fig. 2 is a vertical longitudinal section of the same.

Fig. 3 is a top plan view of the cooled part of the lower bearing, the bearing liner being shown partly broken away to expose the cooling coil.

Fig. 4 is a similar view of the bearing block for the lower half of the upper bearing, the babbitt liner being omitted from the right-hand part of the figure.

Fig. 5 is a vertical section of the same taken on the line 5—5 of Fig. 4.

While in the practical embodiment of my invention which I have shown by way of example, my new bearing is illustrated as applied to the shafts of a rolling mill, it will be understood that my invention is applicable to the bearing for any shaft of sufficient size to permit the arrangement of a cooling coil in the Babbitt metal liner of the bearing. In practice, however, my new bearing is particularly useful in connection with comparatively large shafts which tend to heat rapidly by reason of the friction created by the shaft during its rotation on the bearing surface, which friction may be due to a number of causes such as excess pressure, excess speeds, lubrication difficulties, shocks or other unusual stresses.

It will further be understood that while I have shown by invention applied to a pair of shafts, my new bearing is equally applicable to the bearings for a single shaft, or for a plurality of shafts regardless of the type of machine in which the shafts are used.

As illustrated, however, the shafts 9 and 10 are shown as carrying respectively, the rolls 11 and 12 of a rolling mill in which the greatest heat is generated in the lower half of the lower bearing designated generally by the numeral 13, and in the upper half of the upper bearing designated generally by the numeral 14. I have therefore shown my new bearing structure used in connection with those bearing halves above mentioned, though it will be understood that in those cases where heat is generated in both halves of the bearing, the upper and lower halves of the bearing may be substantially identical insofar as the cooling structures thereof are concerned.

In general, it may be here stated that my new bearing consists primarily of a coil adapted for the passage of a cooling medium therethrough and arranged in the interior of the bearing metal constituting the liner for the bearing, the coil being also arranged with its innermost surfaces as close as possible to the bearing surface of the liner. In the form illustrated herein, the bearings 13 and 14 are much similar to each other when due allowance is made for the direction of rotation of the shafts 9 and 10.

Said bearing 13 comprises in part the bearing block 15 designed to be held in the customary manner in the frame of a machine, and provided with a suitable recess in its inner surface for the reception of the cooling coil 16 and of the babbitt liner 17. The coil 16 may be of any suitable type but as shown, comprises a number of short lengths of pipe arranged in substantially parallel relation longitudinally of the block 15 and joined at the ends thereof by suitable 180° pipe elbows 21 of slightly larger diameter than the pipes and provided with projections resting on the wall of the recess in the bearing block. The pipes are thereby spaced slightly inwardly of said wall to permit the babbitt to flow into the space between the pipes and said wall as will be more fully described hereinafter. The outermost lengths are joined respectively to the pipes 18 and 19, one of which pipes constitute an inlet for the cooling liquid such as cold water which passes through the coil 16, and the other of which constitutes a discharge conduit for said liquid. The elbow projections of the coil 16 rest at the bottom of the recess in the block 15 and the coil may be temporarily or permanently held in place as by means of the flat head screws 20 screwed into the block with the heads thereof engaging the elbows 21. After the coil 16 has been thus secured in place in its recess, the liner 17 is formed by casting molten metal or the like bearing metal into the recess, the Babbitt metal surrounding the coil, filling the remainder of the recess and providing the bearing surface 22 comparatively close to the innermost surfaces of the coil. The babbitt is poured in the usual manner but comes into direct contact with the surfaces of the cooling coil and with the bottom of the coil-receiving recess in the block covering or substantially enclosing the coil. Inwardly of the coil, the babbitt liner 17 is only of sufficient thickness to wear properly, and not of such thickness as to retain any material amount of heat. The liner is thus anchored to the coil and since the coil is in turn anchored to the block 15, it will be seen that the liner cannot slide about on rotation of the shaft.

The upper half of the bearing may be lined with babbitt or not, as may be found desirable, since in the case shown, said upper half receives little, if any, stress on the rotation of the shaft 10. If stressed, said upper half would be substantially identical with the lower half, as has been previously indicated. As shown, the upper half of the bearing comprises the bearing cap 23, suitably secured to the block 15 as by means of the screw bolts 24.

Suitable means may be provided for oiling the bearing and the shaft it supports. Said means, for example, may consist of a gravity feed oiler terminating in the oil-supply pipe 25 passing through the flange 26 of the cap 23 and communicating with the transverse oil groove 27 in the surface 22. A second oil transverse groove 28 arranged close to the termination of the oil groove 27, serves to spread the oil to form the proper oil film around the shaft. Suitable provision may be made for end thrust on the bearing, as by means of the provision of the end plate 30 bolted to the block 15 by means of the bolts 31, and provided with a suitable thrust collar at 32.

The bearing block 35 of the upper half of the upper bearing 14 is similar to the bearing block 15 and provided with a similar coil 36, with a similar inlet or discharge pipe 37, and with a similar end plate 38.

Since the lower half of the bearing 14, however, supports the weight of the upper shaft, it is preferably lined with the Babbitt metal liner 39 anchored to the bearing block 40 as by means of the projections 41 thereon cast into corresponding recesses 42 in the block 40. Suitable means for oiling the bearing 14 may consist, for example, of a gravity feed oiler connected to the oil pipe 43 which communicates with the oil inlet pipe 44 disposed in the oil well 45 of the block 40.

It will be noted that cooling liquid such as water enters one of the pipes 18 and 19 and then passes through the coil 16 and out through the other of said pipes. The pipes constituting the coil 16 are thereby kept cool and being comparatively close to the bearing surface 22, said bearing surface is also kept cool, there being insufficient metal between the coil and the bearing surface to retain any material amount of heat. It thereby becomes possible to use only enough metal inwardly of the coil to provide a wearing surface, since there is no danger of the accumulation of sufficient heat to soften the Babbitt metal or to cause it to run out of the bearing.

It will be understood that while I have described my new bearing in connection with a pair of rolling mill shafts, the bearing can be used equally as well for single shaft bearings wherein both halves are stressed, as for example, by combining the upper bearing block 35 and coil 36 of the bearing 14 with the lower bearing block 15 and coil 16 of the lower bearing to form a bearing which is cooled around its entire inner surface. The inner surface of the coil may extend around as much of the inner cylindrical bearing surface and as close thereto as may be found necessary or advisable.

It will be seen that I have provided a bearing peculiarly adapted for use to sustain heavy stresses and/or where high speeds are desired, and that I have provided a structure well adapted to meet the severe requirements of practical use.

While I have shown and described certain specific embodiments of my invention, I do not wish to be understood as limiting myself thereto, but intend to claim the invention as broadly as may be permitted by the state of the prior art and the scope of the appended claims.

I claim:

1. A bearing comprising a block having a coil-receiving recess, a coil of generally semi-cylindrical form set into said recess with the innermost surfaces thereof spaced outwardly from the bearing surface of the bearing a distance not greater than the radius of the passage in the coil, said coil having a number of parallel lengths of pipe therein, means for securing the coil to the block comprising headed screws inserted between the pipes and having heads of greater diameter than the distance between adjacent lengths of pipe, and a cast bearing metal liner substantially surrounding said lengths and in direct contact with the surfaces thereof and anchored to the block thereby.

2. In a lined bearing, a liner of Babbitt metal and a cooling coil set into the interior of said liner with the innermost surfaces of said coil spaced outwardly of the bearing surface of the liner only sufficiently to provide enough babbitt to withstand the wear on said liner, said coil comprising parallel lengths of pipes, and elbows of greater diameter than said lengths joining the ends of adjacent lengths and spacing at least part of said lengths inwardly of the outermost surface of the liner.

3. A bearing comprising a recessed bearing block, a coil adapted for the passage of cooling liquid therethrough fixed in the recess, said coil comprising substantially parallel lengths of pipe and enlarged elbows at the ends of said lengths, a Babbitt metal liner cast into said recess and around the coil and having an inner bearing surface and an outer surface tangent to the outermost elements of the elbows, said elbows resting on the wall of the recess in said block, and headed screws passing between said pipes and into the block.

4. A bearing comprising a block having a coil receiving recess therein, a coil occupying part of said recess, said coils comprising lengths of pipe joined by enlarged elbows, and a Babbitt metal liner filling the remainder of the recess and in contact with the surfaces of said coil, said elbows supporting the coil with at least part of said lengths in outwardly spaced relation to the wall of the recess.

5. In a bearing, a casing of relatively hard material, a lining within said casing of relatively soft material, means for lubricating said bearing comprising a distributing pocket formed in said lining, means for cooling said bearing comprising a plurality of runs of cooling coils, said runs being connected at their ends by U-shaped fittings, said runs and said fittings being entirely imbedded in said lining along a portion of the length of each in good heat exchange relation therewith, and said runs and said fittings being directly associated with said casing in good stress transmitting relationship therewith, whereby good lubrication at the proper temperature may be effected and stresses within the lining transmitted to its casing without injury to said bearing.

6. In a bearing, a casing of relatively hard material, a lining within said casing of relatively soft material, means for lubricating said bearing comprising a distributing pocket formed in said lining, means for cooling said bearing comprising a plurality of runs of cooling coils, said runs being connected at their ends by U-shaped fittings, said runs and said fittings being imbedded in said lining in good heat exchange relation therewith, said casing being so formed and said fittings and runs being so associated with said casing as to effect contact between portions only of the length of said fittings and portions of said runs with said casing, whereby said cooling means is simultaneously in good heat exchange relationship with said lining and in good stress transmitting relationship with said casing.

7. In a bearing, a casing of relatively hard material, a lining within said casing of relatively soft material, means for lubricating said bearing comprising a distributing pocket formed in said lining, means for cooling said bearing comprising a plurality of runs of cooling coils, said runs being connected at their ends by U-shaped fittings, said runs and said fittings being imbedded in said lining in good heat exchange relation therewith, said casing being so formed and said fittings and runs being so associated with said casing as to effect contact between portions only of the length of said fittings and portions of said runs with said casing, portions of the length of said fittings and portions of said runs being spaced from said casing, whereby said cooling means is simultaneously in good heat exchange relationship with said lining and in good stress transmitting relationship with said casing.

8. In a bearing, a casing of relatively hard material, a lining within said casing of relatively soft material, said lining having contours generally coresponding to a shaft to be associated with said bearing, means for lubricating said bearings comprising a feeding element and a distributing pocket, said pocket being formed within said lining and having side walls, to prevent the escape of lubricant at the sides, and a distributing edge to permit the feeding of oil generally to the lining surface, means for cooling said bearing comprising a plurality of runs of cooling coils, said runs being connected at their ends by U-shaped fittings, said runs and said fittings being imbedded in said lining in good heat exchange relation therewith, said casing being so formed and said fittings and runs being so associated with said casing as to effect contact between portions of the length of said fittings and portions of the length of said runs with said casing, portions of the length of said fittings and portions of the length of said runs being spaced from said casing, whereby said cooling means is simultaneously in good heat exchange relationship with said lining and in good stress transmitting relationship with said casing.

9. In a bearing, a casing of relatively hard material, a lining within said casing of relatively soft material, means for cooling said bearing comprising a plurality of runs of cooling coils, said runs being connected at their ends by U-shaped fittings, said runs and said fittings being imbedded in said lining in good heat exchange relation therewith, said casing being so formed and said fittings and runs being so associated with said casing as to effect contact between portions of the length of said fittings and portions of the length of said runs with said casing, portions of said fittings and portions of said runs along their length being spaced from said casing, whereby said cooling means is simultaneously in good heat exchange relationship with said lining and in good stress transmitting relationship with said casing.

10. In a bearing, a casing of relatively hard material, a lining within said casing of relatively soft material, means for cooling said bearing comprising a run of cooling coil, said run being so associated with the said lining and the said casing as to have a portion thereof along its axial length entirely surrounded by the said lining and a portion thereof in good physical and stress transmitting contact with said casing, whereby said cooling means is simultaneously in good heat exchange relation with said lining and in good stress transmitting relation with said casing.

ALBERT H. JUNG.